US012235365B2

(12) United States Patent
Zarowski et al.

(10) Patent No.: US 12,235,365 B2
(45) Date of Patent: *Feb. 25, 2025

(54) INTERFERENCE MITIGATION FOR RECEIVED GPS AND RADIO COMMUNICATION SIGNALS

(71) Applicant: Mayflower Communications Company, Inc., Bedford, MA (US)

(72) Inventors: Christopher Jonathan Zarowski, Burlington, MA (US); Huan-Wan Tseng, Westford, MA (US); William LeComte, Burlington, MA (US)

(73) Assignee: Mayflower Communications Company, Inc., Bedford, MA (US)

( * ) Notice: Subject to any disclaimer, the term of this patent is extended or adjusted under 35 U.S.C. 154(b) by 355 days.

This patent is subject to a terminal disclaimer.

(21) Appl. No.: 17/581,269

(22) Filed: Jan. 21, 2022

(65) Prior Publication Data
US 2022/0146687 A1 May 12, 2022

Related U.S. Application Data

(63) Continuation-in-part of application No. 16/260,468, filed on Jan. 29, 2019, now Pat. No. 11,262,457.

(51) Int. Cl.
*G01S 19/21* (2010.01)
*G01S 19/23* (2010.01)
(Continued)

(52) U.S. Cl.
CPC .............. *G01S 19/21* (2013.01); *G01S 19/23* (2013.01); *G01S 19/246* (2013.01); *G01S 19/14* (2013.01);
(Continued)

(58) Field of Classification Search
CPC ........ G01S 19/21; G01S 19/215; G01S 19/23; G01S 19/246; G01S 19/14; G01S 19/36; G01S 19/20; G01S 19/22; G01S 19/24
(Continued)

(56) References Cited

U.S. PATENT DOCUMENTS 6,598,009 B2 * 7/2003 Yang ........................ H01Q 3/30
342/423
9,612,342 B2 * 4/2017 Petersen ................. G01S 19/54
(Continued)

FOREIGN PATENT DOCUMENTS

WO WO-2005081011 A2 * 9/2005 ........... G01C 21/206

*Primary Examiner* — Chuong P Nguyen
(74) *Attorney, Agent, or Firm* — Kaplesh Kumar

(57) ABSTRACT

System and method for concurrent STAP (space-time adaptive processing) filtering of interference signals (e.g., jamming signals) from signals received at a broadband antenna array via satellite and terrestrial broadcasts and communication systems operating in the 950 MHz to 1.65 GHz L-band, including but not limited to Link 16 terrestrial communications, Iridium satellite communications, and the Global Positioning System (GPS) and other Global Navigation Satellite Systems (GNSS). While the GPS/GNSS signals are protected against jamming using Nulling of the interfering signals, the Iridium and other communication systems' signals are protected using Beamforming. Use of a common broadband antenna and common front-end signal processing of the received signals enables an integrated system for use on a wide range of platforms, including without limitation size-, weight-, and power-constrained platforms such as drones, unmanned aerial vehicles (UAVs), and helicopters.

36 Claims, 7 Drawing Sheets

(51) Int. Cl.
 *G01S 19/24* (2010.01)
 *G01S 19/14* (2010.01)
 *G01S 19/20* (2010.01)
 *G01S 19/22* (2010.01)
 *G01S 19/36* (2010.01)

(52) U.S. Cl.
 CPC ............. *G01S 19/20* (2013.01); *G01S 19/215* (2013.01); *G01S 19/22* (2013.01); *G01S 19/24* (2013.01); *G01S 19/36* (2013.01)

(58) Field of Classification Search
 USPC ............ 342/357.56, 357.59, 357.62, 357.63, 342/357.52, 357.76
 See application file for complete search history.

(56) References Cited

U.S. PATENT DOCUMENTS

| | | | | |
|---|---|---|---|---|
| 11,262,457 | B2 * | 3/2022 | Zarowski | G01S 19/246 |
| 11,411,316 | B2 * | 8/2022 | Panther | H01Q 5/385 |
| 11,463,071 | B2 * | 10/2022 | Lennen | G01S 19/21 |
| 11,670,848 | B2 * | 6/2023 | Kwon | H04B 7/0845 |
| | | | | 342/378 |
| 11,693,122 | B1 * | 7/2023 | Alexander | G01S 19/215 |
| | | | | 342/357.59 |
| 11,733,389 | B1 * | 8/2023 | Johnston | G01S 19/37 |
| | | | | 342/357.62 |
| 2019/0363819 | A1 * | 11/2019 | Cooper | H04K 3/226 |

* cited by examiner

| Iridium Satellite | Omni Breakpoint | Adapt Breakpoint | Protection |
|---|---|---|---|
| 64 | 60 dB | 35 dB | 25 dB |
| 47 | 60 dB | 30 dB | 30 dB |

Beamforming protection for Iridium satellites 64 and 47.

FIG. 5

| Iridium Satellite | Omni Breakpoint | Adapt Breakpoint | Protection |
|---|---|---|---|
| 46 | 50 dB | 20 dB | 30 dB |
| 20 | 50 dB | 10 dB | 40 dB |
| 49 | 45 dB | 5 dB | 40 dB |
| 11 | 50 dB | 10 dB | 40 dB |
| 03 | 50 dB | 20 dB | 30 dB |

Beamforming protection for Iridium satellites 46, 20, 49, 11 and 3.

FIG. 6

| Iridium Satellite | Omni Breakpoint | Adapt Breakpoint | Protection |
|---|---|---|---|
| 31 | 70 dB | 30 dB | 40 dB |
| 32 | 70 dB | 45 dB | 25 dB |
| 91 | 70 dB | 45 dB | 25 dB |
| 58 | 65 dB | 40 dB | 25 dB |
| 96 | 65 dB | 30 dB | 35 dB |

FIG. 7

Beamforming protection for Iridium satellites 31, 32, 91, 58, and 96.

INTERFERENCE MITIGATION FOR RECEIVED GPS AND RADIO COMMUNICATION SIGNALS

This application is a continuation-in-part of application Ser. No. 16/260,468, filed 29 Jan. 2019, entitled INTEGRATED INTERFERENCE MITIGATION FOR IRIDIUM USER HANDSETS AND GPS RECEIVERS, which is incorporated in its entirety herein by reference to provide continuity of disclosure.

The present invention was made with U.S. Government support under Contract No. N68936-13-C-0131 awarded by the Naval Air Warfare Center Weapons Division of the Naval Air Systems Command (NAVAIR). The U.S. Government has certain rights to this invention.

FIELD OF THE INVENTION

This invention deals generally with concurrently protecting data received via satellite and terrestrial broadcasts and communication systems operating in the 950 MHz to 1.65 GHz L-band, including but not limited to Link 16 terrestrial communications, Iridium satellite communications system downlink data received using an Iridium user handset (radio, or transceiver), as well as the Global Positioning System (GPS) and other Global Navigation Satellite Systems (GNSS) navigation data measurements obtained using a GPS or other GNSS receiver in a RF (Radio frequency) jammed environment. More particularly, this invention provides an integrated solution to the problem of protecting GPS and Iridium (both as defined more broadly hereinafter), user links in a continuously or intermittently jammed environment.

BACKGROUND OF THE INVENTION

In this specification and its claims, the terms "jamming" and "interference" are used interchangeably, and are meant to be construed broadly to include without limitation ambient disturbances and interference signals emitted by both narrowband and broadband jammers. Similarly, the term "GPS" is to be construed broadly, and must be read to include not only the United States' Global Positioning System and its transmitted signals, but all Global Navigation Satellite Systems ("GNSS") using CDMA ("Code Division Multiple Access") technology and their (i.e., GNSS's) broadcast signals. For avoidance of doubt, however, the claims herein describe such systems and signals as "GPS and other GNSS" systems and signals.

Likewise, the terms "Iridium" signal(s), Iridium handset, or Iridium communication system are to be construed broadly, and must be read in the specification and claims to include not only Iridium signals, Iridium handset, and the Iridium communication system, but also all satellite and terrestrial signals, receiving devices, and communication systems, including but not limited to Link 16 signals, devices and communication system, operating in the 950 MHz to 1.65 GHz L-band spectrum, where the thus construed Iridium signals are received at a broadband antenna covering the 950 MHz to 1.65 GHz range.

In general, Space Time Adaptive Processing (STAP) for anti-jam (AJ) is well-known (See, e.g., textbook E. D. Kaplan, C. J. Hegarty, *Understanding GPS: Principles and Applications*, Artech House, $2^{nd}$ edition) and has been used to suppress jamming (i.e., interfering) signals that may corrupt data transmissions from GPS satellites. The most basic STAP filter design computes the STAP filter weights vector to minimize the output power of the filter while avoiding the null weight vector solution. We refer to this solution herein as Nulling. As the GPS signals are below the receiver system noise floor while jamming signals are commonly above the noise floor, the Nulling STAP filter tends to suppress the jammer signal(s) with little attenuation of the GPS signal, unless the GPS signals and jammer signals arrive at the antenna array from similar direction(s).

By contrast, in the case of data communications satellite and terrestrial systems, such as Iridium and Link 16, the signals at the receiver are typically positive signal-to-noise ratio (SNR) and thus are above the noise floor of the receiver. In this case Nulling will tend to suppress not only the interference but also the desired signal. It is, therefore, necessary to adopt a STAP filter design where the filter weights minimize the output power of the filter while being constrained to maintain the gain in the desired signal (e.g., Iridium space vehicle (SV) or Link-16 terrestrial platform) direction. We refer to this solution as Beamforming, realized using a Beamformer and represented by the Capon beamforming solution See, e.g., J. Capon, "High-Resolution Frequency-Wavenumber Spectrum Analysis," Proc. IEEE, 57(8), August 1969, pp. 1408-1418 (hereinafter "Capon"); See also, N. L. Owsley, *Systolic Array Adaptive Beamforming*, NUSC Tech. Rep. 7981, Naval Underwater Systems Center, Newport, RI, and New London, CT, 21 Sep. 1987 (hereinafter "Owsley")).

It is beneficial to combine the protection of communication link signals, e.g., an Iridium user handset (radio) (for satellite communication) or Link 16 data communication transceiver (for terrestrial communication) or other similar receive or transceive devices, with the protection of a GPS receiver signal (for satellite navigation) employing a common wideband receive antenna and signal processing circuits to reduce the size, weight, power and cost (SWaP-C) of the integrated interference protection system solution for both communication and navigation receive links. The antenna may be composed of multi-element arrays of patch-elements, and/or polarimetric elements, such as bent monopole elements and/or loop elements. Some classes of polarimetric-element arrays require mode-forming, which may be implemented either with analog components or implemented digitally within the device. All such antennas, digital implementations, and analog implementations are within the scope of the instant invention and the claims herein.

The Iridium user data channel offers a means to provide the GPS receiver with aiding data in support of assisted-GPS (A-GPS) navigation operations. Since Beamforming is applied to protect the Iridium signal, the computation of the STAP weights requires knowledge of the line-of-sight (LOS) vector from the platform antenna array to the Iridium SV, along with the antenna array/RF electronics response in that direction. This in turn requires platform position information obtained by the GPS receiver (which itself is protected using Nulling). Platform orientation information, similarly, may be obtained via an inertial navigation system (INS) mounted on the platform. Alternate means of accessing platform position and/or orientation, such as with the aid of magnetic sensors or visual aids, are within the scope of the instant invention and the claims herein. The Iridium satellite position is known via the almanac information, or provided by other means known to ordinary persons skilled in the art.

Presently, there is no integrated anti-jamming solution which protects both Iridium data communications and GPS user navigation signals in an efficient compact system or otherwise, thereby permitting each system to benefit from the operations of the other under interference conditions.

The data communications capability of Iridium allows provision of aiding data (e.g., GPS navigation messages) to GPS, and GPS position data enables setting the beam direction in the beamforming to protect Iridium.

Space-constrained military platforms, such as submarines, unmanned aerial vehicles, and aircraft, have had an evolving unmet need for concurrently protecting both Iridium communication and GPS navigation systems against jamming at a lower SWaP-C. This is achieved herein by the synergistic integration of the radio communication-navigation links, instead of simply adding the SWaP-C of two individual subsystems. No such system is currently available in any size, let alone one that is compact enough for use with the small platforms, including drones, UAVs and helicopters, where space is at a premium.

For the above reasons, compact integrated antijam ("AJ") systems using innovative antenna array design and signal processing solutions are required to simultaneously protect the Iridium and GPS user equipment against interference while allowing installation and use aboard the smaller space-constrained platforms. The preferred solution herein integrates with a small broadband antenna array capable of operating at both GPS L1 and L2 bands as well as the Iridium communication system band.

SUMMARY OF THE INVENTION

The present invention solves the problem of concurrently protecting the Iridium and GPS user bands against interference in a suitably efficient and compact package using a small broadband controlled reception pattern antenna (sCRPA) that provides coverage of the GPS L1 and L2 bands along with the Iridium user band. The GPS L1 band is centered at 1575.42 MHz with at least a 24 MHz bandwidth to accommodate the M-Code waveform. Similarly, the GPS L2 band is centered at 1227.60 MHz with at least a 24 MHz bandwidth to accommodate the M-Code waveform. The Iridium user band is centered at 1621.25 MHz with a bandwidth of 10.5 MHz, and so (like GPS) is also an L-band waveform. Link 16 comprises low-probability-of-intercept (LPI) frequency-hopping L-band high speed digital data link operating in the 960 to 1,215 MHz range. The integrated system disclosed herein achieves its antijam performance and size, weight and power goals by using a common broadband antenna and common front end signal processing for both the GPS receiver and the Iridium communication system radio handset.

FIG. 1 is an overview of one embodiment of the system depicting an eight element sCRPA 11 broadband receive antenna array integrated with an Iridium TX transceive (i.e., transmit and receive) patch antenna element 12. (The transceive patch element 12 supports Iridium user uplink data transmissions to the Iridium SV.) The specific types of patch element and array, and number of antenna elements are illustrative and not limiting. The antenna may be composed of multi-element arrays of patch-elements, and/or polarimetric elements, such as bent monopole elements and/or loop elements. Some, not all, classes of polarimetric-element arrays require mode-forming, which may be implemented either with analog components or implemented digitally within the device. All such antennas are within the scope of the claims herein.

Signal outputs from the array are downconverted and digitized into complex baseband samples, which are optionally available for digital (or analog) mode forming (e.g., Butler array), prior to the signal processing for suppressing the GPS-bands jamming and Iridium-band jamming 13.

While the parent application, Ser. No. 16/260,468, claimed filtering of interference signals using antenna modes, this continuation-in-part application discloses and claims filtering of interference signals through the processing of antenna array element signals (i.e., without forming modes), which is enabled for large antenna arrays such as the U.S. military's Advanced Digital Antenna Production (ADAP) antenna. The depicted embodiment shows an Iridium unprotected bypass mode of operation 14, whereby, if desired by the user, the Iridium radio bypasses its AJ protection. A circulator 15 enables passage of both Iridium uplink and downlink signals.

The GPS/Iridium AJ system 13 implements Nulling for the protection of the GPS L1 and/or L2 band transmissions and Beamforming for the protection of the Iridium user downlink transmission. Both Nulling and Beamforming algorithms run concurrently. Algorithms may be implemented in a programmable device, including, for example, a combination of hardware (HW), such as FPGA technology, and software (SW) running on a general purpose processor (GPP) or implemented entirely in software on a processor. An illustrative split between HW and SW functionality appears in FIG. 2 which is discussed in more detail later. The most compute-intensive aspects of the algorithms (e.g., fast-Fourier transform (FFT), matrix inversion/factorization) are preferably implemented in HW, but may alternatively be implemented in SW. Less demanding aspects may be implemented in SW (e.g., determination of beam direction, HW control). However, the particular division of work between HW and SW described herein is understood to be illustrative and not limiting.

An RF pathway out of the anti-jamming system to the Iridium radio is provided 16. Similarly, an RF pathway out of the anti-jamming system to the GPS receiver is provided 17. The anti-jamming system performs digital up-conversion (DUC) and then, optionally, RF up-conversion (not shown), should RF signals be required by the Iridium radio and/or the GPS receiver.

An inertial navigation system (INS) may interact with GPS 18 where GPS (when available) provides calibration information for the inertial measurements unit (IMU, component of the INS), and the INS provides the Iridium/GPS receiver platform attitude information used in beam pointing needed by the Beamformer.

BRIEF DESCRIPTION OF THE DRAWINGS

The instant specification is better understood using the drawings below. The drawings, however, are primarily for illustration and must not to be construed as limiting.

FIG. 5 is a table of Beamforming protection levels for Iridium SVs 64, and 47 from a test conducted on 11 Oct. 2016.

FIG. 6 is a table of Beamforming protection levels for Iridium SVs 46, 20, 49, 11, and 3 from a test conducted on 17 Oct. 2016.

FIG. 7 is a table of Beamforming protection levels for Iridium SVs 31, 32, 91, 58, and 96 from a test conducted on 2 Nov. 2016.

DETAILED DESCRIPTION OF THE INVENTION

Figure 1:
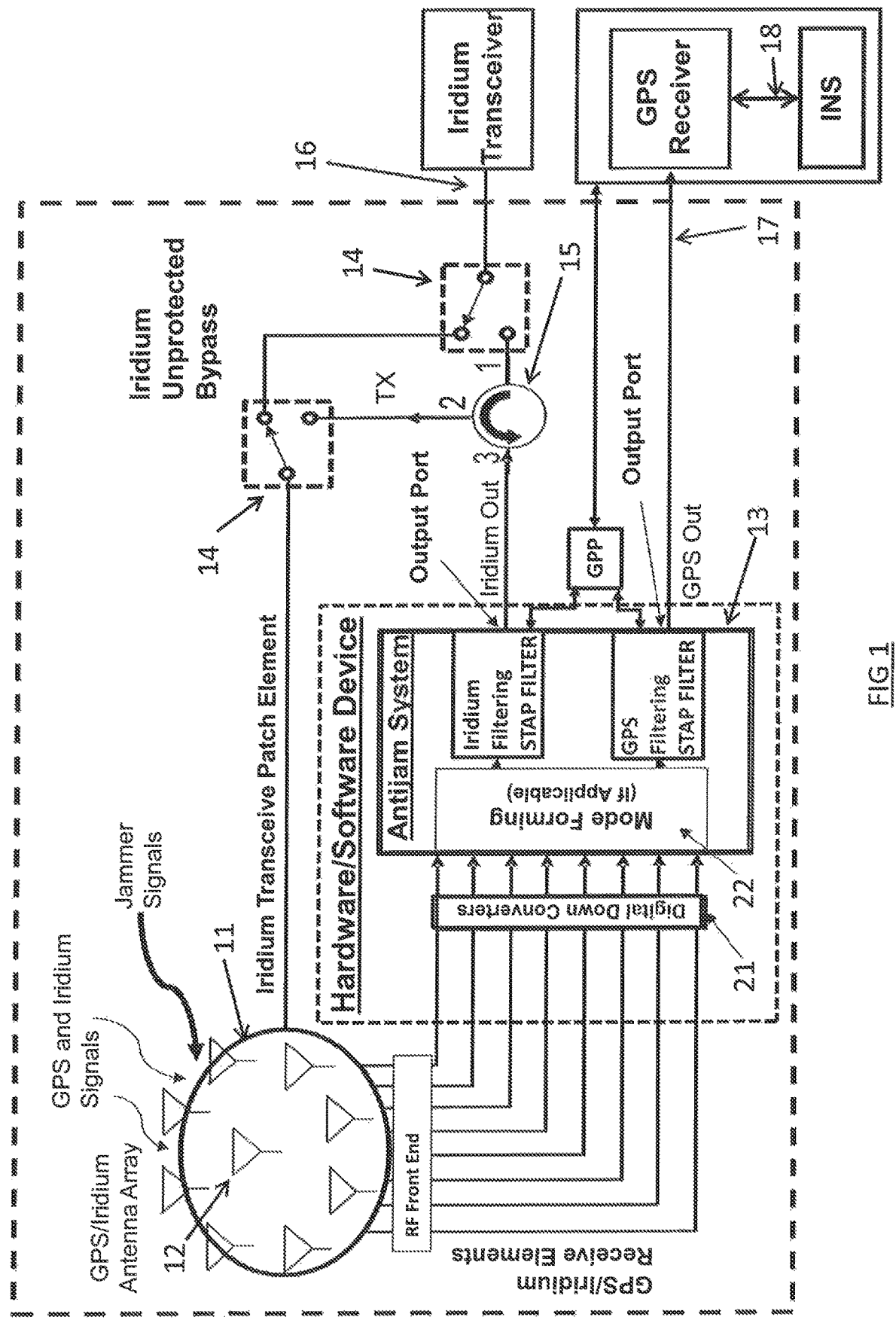
FIG. 1 is a block diagram of the main components of the integrated Iridium/GPS anti-jamming (AJ) system.

FIG. 1 is an overview of one embodiment of the system depicting an eight element sCRPA 11 broadband receive antenna array integrated with an Iridium TX transceive patch antenna element 12. (The transceive patch element 12 supports Iridium user uplink data transmissions to the Iridium SV.) The specific types of patch element and array, and number of antenna elements are illustrative and not limiting. The antenna may be composed of multi-element arrays of patch-elements, and/or polarimetric elements, such as bent monopole elements and/or loop elements. Some, not all, classes of polarimetric-element arrays require mode-forming. For example, mode-forming is required with antenna systems based on small CRPA (Controlled Reception Pattern Antenna) arrays, whereas the larger ADAP (Advanced Digital Antenna Production) antenna array does not require mode-forming for effective antijam processing of the received signals. All such antenna array based implementations requiring antijam processing with and without mode-forming are within the scope of this disclosure and the claims herein.

Signal outputs from the antenna array are downconverted and digitized into complex baseband samples, which are optionally available for digital modeforming (e.g., Butler array), if desired, prior to the signal processing for suppressing the GPS-bands jamming and Iridium-band jamming 13. The depicted embodiment shows an Iridium unprotected bypass mode of operation 14, whereby, if desired by the user, the Iridium radio bypasses its AJ protection. A circulator 15 enables passage of both Iridium uplink and downlink signals.

The GPS/Iridium AJ system 13 implements Nulling for the protection of the GPS L1 and/or L2 band transmissions and Beamforming for the protection of the Iridium user downlink transmission. Both Nulling and Beamforming algorithms run concurrently. Algorithms may be implemented in software (SW) or in a combination of hardware (HW), such as Field Programmable Gate Array (FPGA) or Application Specific Integrated Circuit (ASIC) technology, and software running on a general purpose processor (GPP). An illustrative split between HW and SW functionality appears in FIG. 2. The most compute-intensive aspects of the algorithms (e.g., fast-Fourier transform (FFT), matrix inversion/factorization) are preferably implemented in HW (but may also be implemented in SW), while less demanding aspects are implemented in SW (e.g., determination of beam direction, HW control). The particular division of work between HW and SW described herein is understood to be illustrative and not limiting.

The Nulling solution for the protection of GPS involves computing sample covariance matrices from the complex-valued, baseband (and, optionally, mode-formed) data output from the antenna array. The inverse of the sample covariance matrix is multiplied by a pseudo-steering vector to obtain the STAP-filter's complex-valued weight vector. The pseudo-steering vector is a vector with a unity-valued element that normally corresponds to the branch center-tap of the antenna array reference element (or the reference omni-mode for mode-formed arrays). The Nulling solution is well-known art with already known performance characteristics, so further details are not provided. See, e.g.,

*Understanding GPS: Principles and Applications*, Editors: E. D. Kaplan and C. J. Hegarty, Artech House, 2006.

Figure 2:
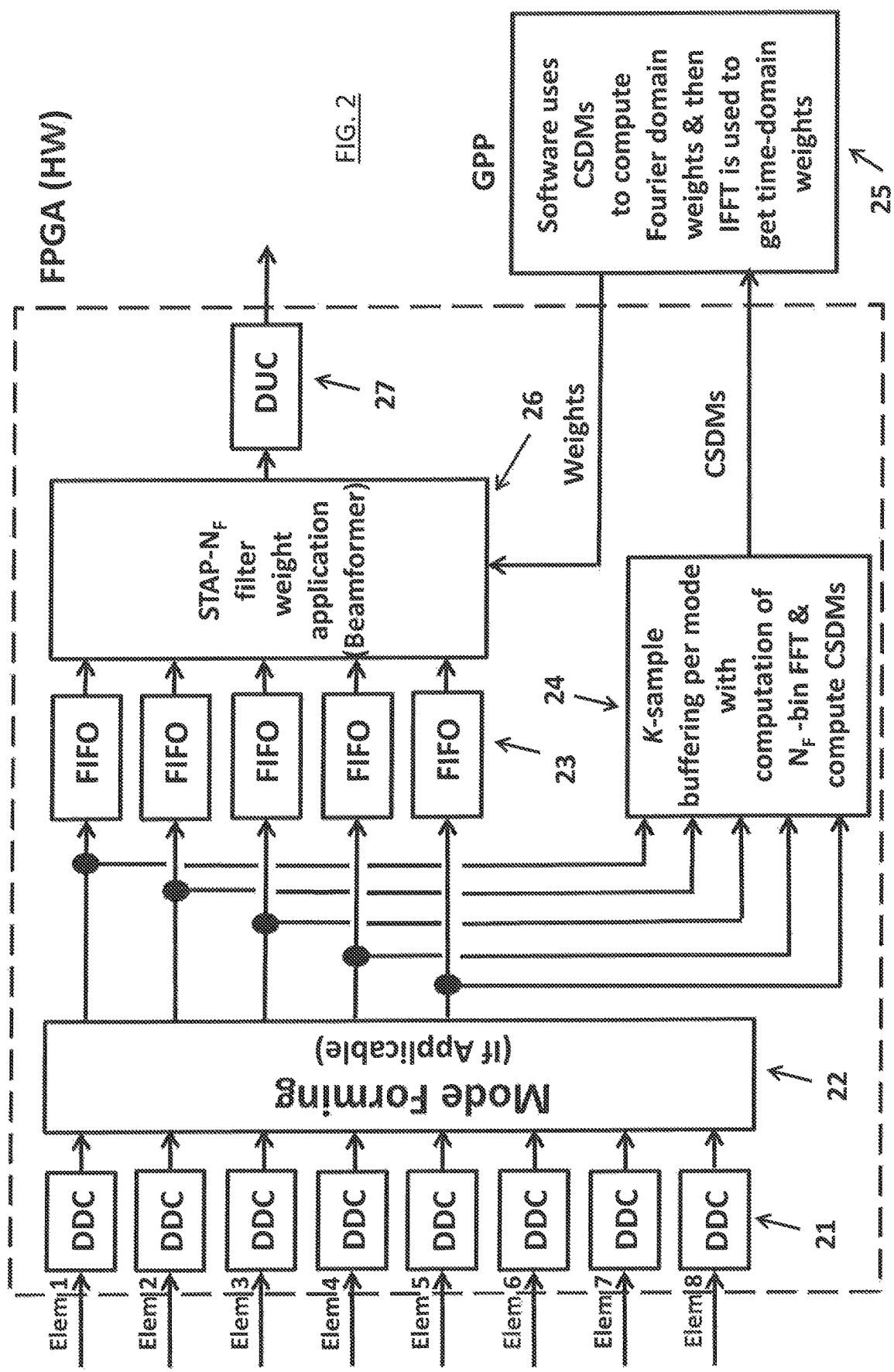
FIG. 2 is a block diagram of Beamforming showing an example division of signal processing tasks between hardware (HW) and software (SW).

The Beamforming solution is closely examined in FIG. 2 with an illustrative but not limiting embodiment. Digital down converters (DDCs) 21 convert the real-valued outputs of analog-to-digital (A/D) converters (not shown) to complex baseband form. The example here shows without limitation that the eight DDC converter-bank outputs (which correspond, respectively, to the eight signals received from the eight antenna elements) are, optionally, input to a digital mode-forming block 22, if mode forming is implemented, to select the five most efficient modes for the example sCRPA array depicted in FIG. 1. (The choice of five modes is illustrative, and not limiting.) Alternatively, the mode-forming step may be avoided and further STAP filtering performed directly using the complex baseband signals. The complex-valued time-domain samples (from mode forming, if implemented, or otherwise) are also input to the aforementioned Nulling (not shown). However, for use in Beamforming the samples are preferably buffered (FIFO 23) before being STAP-filtered. The FIFOs permit matching the complex baseband samples that are to be filtered to their appropriate filter weights. The weights themselves are obtained by processing K-sample buffered samples 24 (e.g., K=8192 complex samples/mode).

In this latter processing, described in further detail below, the time-domain K-samples are Fourier transformed (e.g., via $N_F$-bin fast Fourier transform (FFT)), and the transformed data is formed into cross-spectral density matrices (CSDMs) 24, which may also be referred to as Fourier domain sample covariance matrices (per Owsley). The CSDMs are employed in the computation of Fourier domain STAP filter weights 25 as discussed below. Inverse FFTs are employed to convert the Fourier domain weights into the time-domain 25 for use in the STAP filter 26. The STAP filter employs $N_F$ taps per finite impulse response (FIR) filter branch (FIG. 3) where one filter branch is allocated to each antenna array element or mode from the antenna array output. (For illustration only. in FIG. 3, L=5 for a 5-mode system.) The complex-valued samples are digitally up-converted (See e.g., DUC 27), which is the inverse processing to that of the DDC, followed, if and as required, by digital-to-analog (D/A) conversion 28 and RF up-conversion (not shown), and onward transmission to the Iridium radio.

Figure 3:
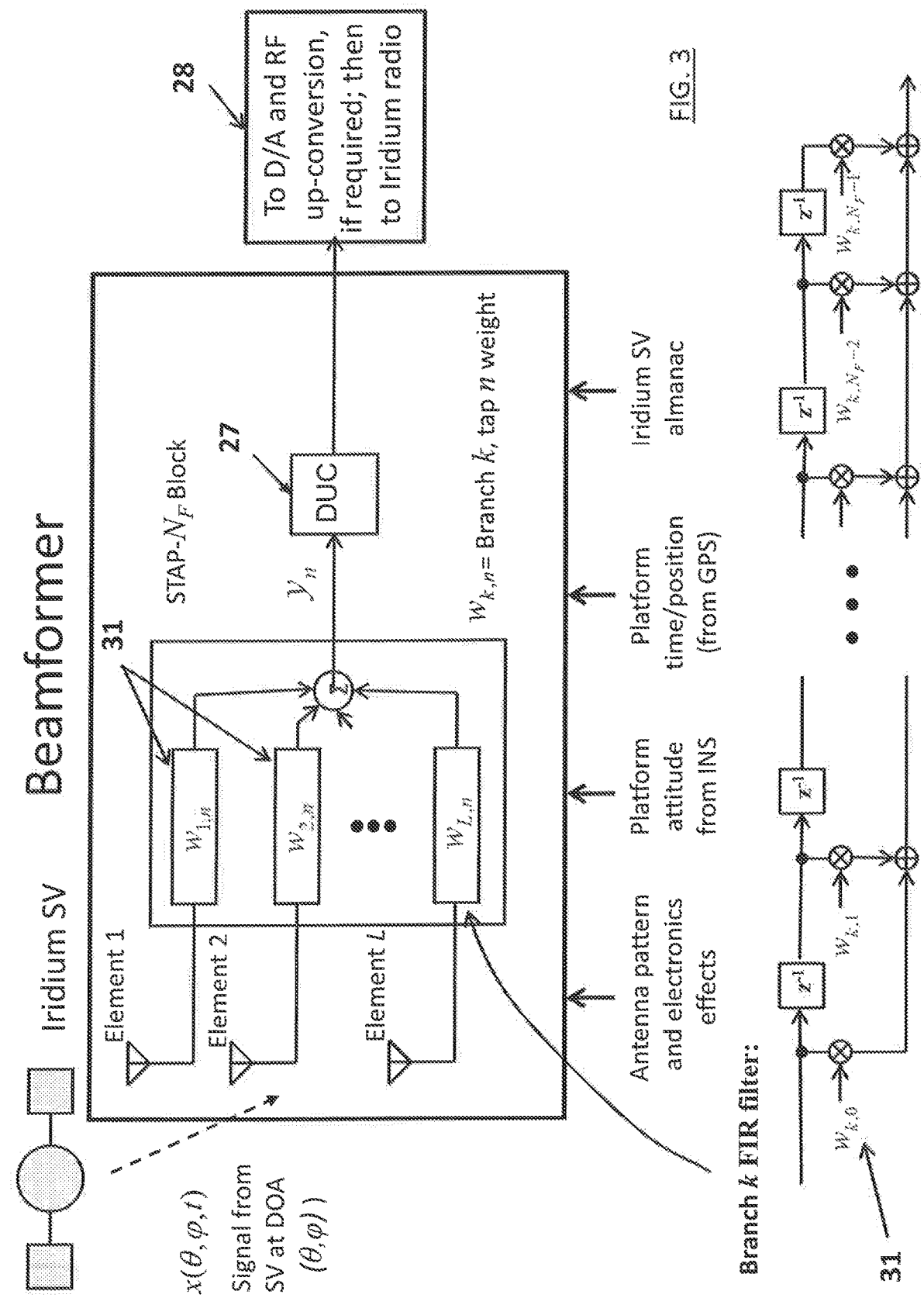
FIG. 3 is a block diagram of additional detail of the design of the Beamformer.

FIG. 3 illustrates the FIR filter signal processing 31 within the Beamformer 26, where $N_F$-tap filtering is applied to each of the L modes or antenna element signals (in FIG. 2 we illustrate for L=5 modes as an example). The term $w_{k,n}$ in FIG. 3 denotes the tap n complex-valued weight applied to the antenna element k or mode-k branch. The antenna element k or mode-k antenna array response at the frequency $\omega$ in the Iridium space vehicle (SV) signal direction $(\theta, \varphi)$ (where $\theta$=azimuth, $\varphi$=elevation in the platform's local Cartesian frame), may be represented as $A_k(\theta, \varphi, \omega)$. We call $(\theta, \varphi)$ the Iridium signal direction-of-arrival (DOA).

Thus, FIG. 3 also indicates that beamforming requires antenna pattern data (inclusive of RF electronics effects) for obtaining the correct steering vector to the Iridium SV. The direction-of-arrival (DOA) depends on the line-of-sight (LOS) to the Iridium SV from the platform hosting the antijam system (AJ system), inertial navigation system (INS), and GPS and Iridium receivers. The LOS is determined from both platform orientation ((INS)-derived information) and platform position (GPS-derived information) in space. For satellite communication, Iridium SV almanac information is also needed to determine which Iridium SV is in view, as LOS also requires position information about the Iridium SV.

The Beamforming algorithm employed herein is Capon's algorithm (See, e.g., Capon, and Owsley). This algorithm minimizes the STAP filter output power to achieve nulling of the interference, while at the same time the gain response of the STAP filter is constrained to unity to prevent nulling of the Iridium user's downlink signal.

Figure 4:
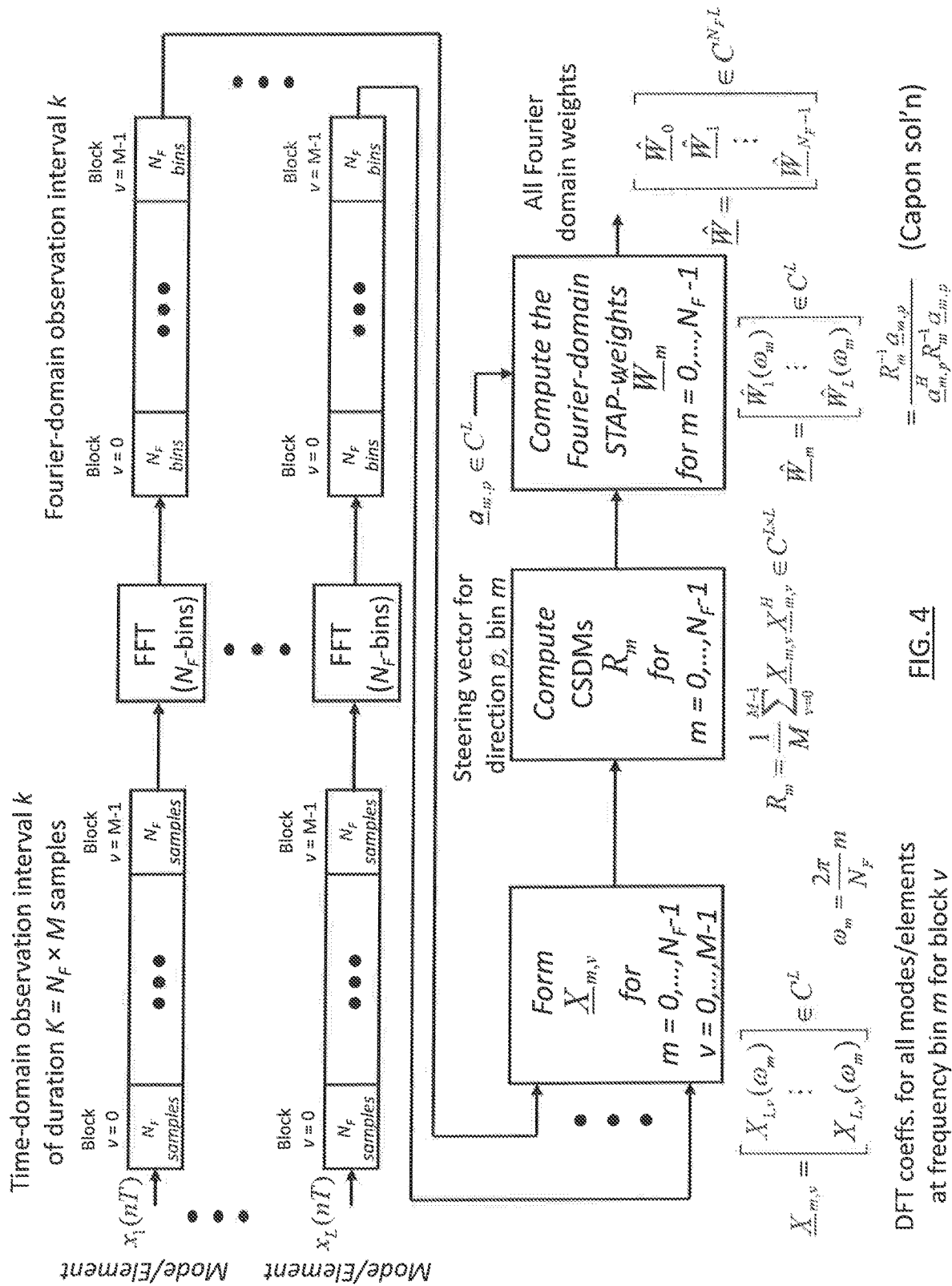
FIG. 4 is a block diagram of signal processing steps used to obtain the Beamformer weights in the Fourier domain.

FIG. 4 depicts the key signal processing steps involved in obtaining the Beamformer weights. The DDC 21 sample sequences are denoted $x_k(nT)$ where T is the DDC sampling interval and $k=1,2,\ldots, L-1, L$ for an antenna array of L antenna elements or modes, (e.g., L=5). In FIG. 4, sample blocks of length K complex samples per mode or antenna element are sub-divided into non-overlapping segments each of length $N_F$ samples, and thus $K=MN_F$, for which M is the number of segments. Each $N_F$ length segment is transformed using $N_F$-bin DFT/FFT operations to obtain a K-sample transformed data (Fourier coefficients) set per mode. Relatively long sample blocks (large K) are needed to obtain good covariance estimates. It has been found in experimentation with a prototype system that K may range from 2048 to 8192 samples. Prototyping also shows that $N_F=16$ yields acceptable performance.

The Fourier bin m segment (or block) v FFT coefficients for each antenna element or mode are accumulated into a length L complex-valued column vector denoted $\underline{X}_{m,v} = [X_{1,v}(\omega_m)\ X_{2,v}(\omega_m)\ \ldots\ X_{L,v}(\omega_m)]^T$ in FIG. 4. The Fourier bin m cross-spectral density matrix (CSDM) (also called Fourier domain sample covariance matrix) is obtained via the outer products summations:

$$R_m = \frac{1}{M}\sum_{v=0}^{M-1} \underline{X}_{m,v} \underline{X}_{m,v}^H \in C^{L\times L} \tag{1}$$

These CSDMs are applicable for the observation time k, and the computed beamformer STAP weights (see below) apply to these same samples as well.

Following Owsley, the following quadratic programming problem (QPP), when solved using the steering vector $\underline{a}_{m,p}$ (defined below), yields the Fourier domain STAP weights, $\underline{\hat{W}}_m$:

$$\underline{\hat{W}}_m = \underset{\underline{W}_m}{\operatorname{argmin}}\ \underline{W}_m^H R_m \underline{W}_m \text{ subject to } \underline{W}_m^H \underline{a}_{m,p} = 1 \tag{2a}$$

for $m=0,1,\ldots, N_F-1$ in general, or only some relevant subset of these indices such as those covering the Iridium user downlink band.

The steering vector is $$\underline{a}_{m,p} = [A_1(\theta_p,\varphi_p,\omega_m) A_2(\theta_p,\varphi_p,\omega_m) \ldots A_L(\theta_p,\varphi_p,\omega_m)]^T \in C^L \tag{2b}$$

This is from pre-stored antenna pattern and includes all RF electronics effects at frequency $\omega_m$ (baseband equivalent, normalized frequency scale) in the pth signal direction $(\theta_p,\varphi_p)$ (i.e., azimuth, elevation) over all of the available antenna array modes $k=1,2,\ldots L$. Thus, $A_k(\theta,\varphi,\omega)$ represents the mode (or antenna element, if there is no mode forming) k antenna pattern.

The linear equality constraint in (2a) constrains the STAP filter gain to be unity in the desired DOA, and across the band for which the constraints are applied. Implicitly, a linear phase response is also imposed over that band. However, the Iridium transmissions are very narrowband and so the linear phase response characteristic of the solution from solving (2a) is not critical.

From the method of Lagrange multipliers, the solution to the constrained QPP in (2a) is as follows, which is the well-known solution to the Capon beamforming weights design problem:

$$\underline{\hat{W}}_m = \frac{1}{\underline{a}_{m,p}^H R_m^{-1} \underline{a}_{m,p}} R_m^{-1} \underline{a}_{m,p} = \begin{bmatrix} \hat{W}_1(\omega_m) \\ \hat{W}_2(\omega_m) \\ \vdots \\ \hat{W}_L(\omega_m) \end{bmatrix} \in C^L \tag{3}$$

The computation (3) is done for bin m covering the 10.5 MHz Iridium user band at complex baseband. The Fourier domain weights for a bin that is not in this band are simply set to zero. From Equation (3) we see that a given L-element solution vector contains the Fourier domain weights for all the modes or antenna elements at that bin index. Thus, an implementation must search through all solution vectors to extract all of the Fourier domain weights for any given mode or antenna element of interest.

The Fourier domain weights from (3) are transformed into the time-domain using the inverse FFT so that filtering may be realized using STAP.

The Beamformer design described herein has been implemented as a prototype and tested a number of times against live in-sky Iridium satellite signals with broadband (BB) injected jamming signals. The Beamforming anti-jam (AJ) test procedure used was as follows:

a. Align 0-deg azimuth (AZ) angle of the antenna array to the true North direction.
b. Use software to predict a tracked Iridium satellite and ensure it is a rising satellite.
c. Without jamming, let the Iridium phone track the satellite by going to "registered" state.
d. Turn on the broadband (BB) jammer to jam out the Iridium phone. The Iridium phone should go to "searching for network" state after the jammer is turned on. The jamming power at this time is the OMNI break point. Because we don't have enough time to dwell in the OMNI mode to search for the OMNI break point during AJ tests, this OMNI break point needs to be determined before the AJ tests.
e. Switch from OMNI mode to Beamforming ADAPT mode and wait for the Iridium phone to recover to the "registered" state. (The ADAPT mode pertains to Iridium handset operation in the presence of jammer signals.
f. Check if the Iridium phone remains in "registered" state for 15 seconds. If so, increase the jamming power by 5 dB. If the Iridium phone remains in "registered" state for another 15 seconds, then increase the jamming power by another 5 dB. Repeat the process until the Iridium phone goes to "searching for network" state; the jamming power at this time is at the ADAPT break point.
g. Record the jamming power at OMNI break point and ADAPT break point, and the difference is the AJ protection of Beamforming.

FIG. 5, FIG. 6, and FIG. 7 provide tables of protection levels achieved based on this test procedure in the case of one BB jammer where each test was performed on a different day. Protection levels ranging from 25 to 40 dB were observed over a range of conditions. The OMNI and ADAPT break points are given as attenuation levels in decibels for the respective jammer power.

The scope of the invention is to be limited only by the claims, and not by the drawings or description herein. The words "including", "comprising", "having," "with" and other like words used herein are to be interpreted broadly and comprehensively. Moreover, any embodiments disclosed in the subject application must not be taken as the only possible embodiments. Other embodiments will occur to those skilled in the art and are within the scope of the claims herein.

We claim:

1. An antijam system for suppressing interference signals received with Iridium and GPS and other GNSS signals comprising:
    An antenna array having a plurality of antenna elements with signal reception coverage over the 950 MHz o 1.65 GHz frequency band;
    an RF front end for outputting downconverted and digitized antenna array received signals;
    means for digitally downconverting the digitized signals to baseband, suppressing the interference signals by filtering the baseband signals, and outputting filtered Iridium and GPS and other GNSS signals; and
    a navigation system for determining antenna array orientation.

2. The system of claim 1, wherein signal reception over the 950 MHz to 1.65 GHz frequency band includes reception of satellite and terrestrial radio communication signals.

3. The system of claim 2, wherein the satellite and terrestrial radio communication signals Include Iridium and GPS and other GNSS signals.

4. The system of claim 3, wherein the interference signals are suppressed from the Iridium signals in a first filter.

5. The system of claim 4, wherein the first filter is a first STAP filter.

6. The system of claim 4, wherein the interference signals are suppressed from the Iridium signals in the first STAP filter by beamforming.

7. The system of claim 4, wherein the filtered Iridium signals are digitally up-converted for RF conversion and up-conversion.

8. The system of claim 3, wherein the interference signals are suppressed from the GPS and other GNSS signals in a second filter.

9. The system of claim 8, wherein the second filter is a second STAP filter.

10. The system of claim 9, wherein the interference signals are suppressed from the GPS and other GNSS signals in the second STAP filter by nulling.

11. The system of claim 8, wherein the filtered GPS and other GNSS signals are output to a GPS and other GNSS receiver.

12. The system of claim 1, wherein the antenna array is a broadband antenna array selected from the group consisting of multi-element arrays of patch-elements, polarimetric elements, and loop elements.

13. The system of claim 1, wherein the means comprise a general purpose processor and a hardware device.

14. The system of claim 13, wherein the hardware device is a logic device.

15. The system of claim 14, wherein the logic device is a Field Programmable Gate Array (FPGA).

16. The system of claim 14, wherein the logic device is an Application Specific Integrated Circuit (ASIC).

17. The system of claim 13, wherein the general purpose processor is a general purpose computer.

18. The system of claim 1, wherein the means comprise a processor programmed to receive antenna array orientation information from the navigation system and digitally downconvert the digitized signals to baseband, suppress the interference signals by filtering the baseband signals, and output filtered Iridium and GPS and other GNSS signals.

19. The system of claim 1, wherein the navigation system is an inertial navigation system.

20. The system of claim 19, wherein the inertial navigation system comprises an inertial measurement unit.

21. The system of claim 20, wherein the inertial measurement unit comprises at least one gyroscope.

22. The system of claim 1, wherein the navigation system includes at least one magnetic field sensor.

23. A method for suppressing interference signals received with Iridium and GPS and other GNSS signals comprising the steps of:
    receiving Iridium signals, GPS and other GNSS signals, and interference signals at an ADAP-sized antenna array;
    downconverting the received signals;
    digitizing the downconverted signals;
    downconverting the digitized signals to baseband;
    determining position and orientation of the antenna array;
    suppressing the interference signals in the baseband signals using satellite almanac data and the antenna array position and orientation, from:
        the Iridium signals in a first filter, and
        the GPS and other GNSS signals in a second filter;
    up-converting, and RF-converting and up-converting the filtered Iridium signals; and
    outputting separate filtered RF up-converted Iridium and digital GPS and other GNSS signals.

24. The method of claim 23, wherein the antenna array is a broadband antenna array.

25. The method of claim 23, wherein the downconverting and digitizing of the antenna array received signals is performed in an RF front end.

26. The method of claim 23, wherein the digital downconverting of the digitized signals to baseband is performed using digital downconverters.

27. The method of claim 23, wherein the first filter is a STAP filter.

28. The method of claim 23, wherein the second filter Is a STAP filter.

29. The method of claim 23, wherein the steps of digital downconverting, suppressing of the interference signals, and digital up-converting of the filtered Iridium signals are performed in a hardware device.

30. The method of claim 29, wherein the hardware device Is a logic device.

31. The method of claim 30, wherein the logic device is a Field Programmable Gate Array (FPGA).

32. The method of claim 30, wherein the logic device is an Application Specific Integrated Circuit (ASIC).

33. The method of claim 23, wherein the steps of digital downconverting, suppressing of the interference signals, and digital up-converting of the filtered Iridium signals are performed in a software device.

34. The method of claim 33, wherein the software device is a processor programmed to perform the steps of digital downconverting, suppressing of the Interference signals, and digital up-converting of the filtered Iridium signals.

35. The method of claim 23, wherein the ADAP-sized antenna array Includes the ADAP antenna array.

36. The method of claim 23, wherein the ADAP-sized antenna array includes antenna arrays larger than the small CRPA.

\* \* \* \* \*